United States Patent
Randell

(10) Patent No.: US 6,936,378 B2
(45) Date of Patent: Aug. 30, 2005

(54) ALKALINE ELECTROCHEMICAL CELLS WITH IMPROVED ELECTROLYTE

(75) Inventor: Christopher Fred Randell, Newton Hall (GB)

(73) Assignee: Eveready Battery Company, Inc., St. Louis, MO (US)

( * ) Notice: Subject to any disclaimer, the term of this patent is extended or adjusted under 35 U.S.C. 154(b) by 44 days.

(21) Appl. No.: 10/297,702

(22) PCT Filed: Jun. 19, 2001

(86) PCT No.: PCT/GB01/02712

§ 371 (c)(1),
(2), (4) Date: Dec. 5, 2002

(87) PCT Pub. No.: WO01/99214

PCT Pub. Date: Dec. 27, 2001

(65) Prior Publication Data

US 2003/0170537 A1 Sep. 11, 2003

(30) Foreign Application Priority Data

Jun. 19, 2000 (GB) .............................................. 0015003

(51) Int. Cl.⁷ ........................ H01M 10/26; H01M 04/58
(52) U.S. Cl. .................... 429/206; 429/229; 429/231.1; 429/224; 429/207
(58) Field of Search ................................ 429/229, 231, 429/224, 231.1, 206, 207, 142

(56) References Cited

U.S. PATENT DOCUMENTS

| | | | |
|---|---|---|---|
| 5,283,139 A | 2/1994 | Newman et al. | |
| 5,489,493 A | 2/1996 | Urry | |
| 6,207,322 B1 | 3/2001 | Kelsey et al. | |

FOREIGN PATENT DOCUMENTS

| | | |
|---|---|---|
| GB | 1 493 786 | 11/1997 |
| JP | 57-39518 | 8/1982 |
| JP | 64-35870 | 2/1989 |
| JP | 05144429 | 11/1993 |
| JP | 10-3915 | 1/1998 |
| WO | WO 98 50969 | 11/1998 |
| WO | WO 99 34460 | 7/1999 |

OTHER PUBLICATIONS

Kordesch Karl., "Manganese Dioxide", vol. 1 *Batteries*, pp. 314–319, Marcel Dekker, Inc., New York, New York, 1974.

*Primary Examiner*—Raymond Alejandro
(74) *Attorney, Agent, or Firm*—Russell H. Toye, Jr.

(57) ABSTRACT

Alkaline electrochemical cells containing no added mercury and having a concentration of potassium hydroxide in the electrolyte, prior to discharge, of between about 34 and 37% (w/w solution) and wherein the amount of electrolyte is such that, after a calculated level of one electron discharge of the manganese dioxide, the calculated concentration of potassium hydroxide is between 49.5 and 51.5% (w/w solution), have superior performance in intermittent discharge tests.

22 Claims, No Drawings

ALKALINE ELECTROCHEMICAL CELLS WITH IMPROVED ELECTROLYTE

The present invention relates to electrochemical cells in which the content of at least one active ingredient has been optimised.

Alkaline electrochemical cells have been commercially available for well over twenty years. In many modern applications, alkaline cells vastly outperform traditional zinc carbon cells, and are the batteries of choice for most consumers.

The competition to produce the best alkaline battery continues to be fierce, but a large number of restrictions exist, not least of which is the size of any given cell.

Conventional sizes for primary alkaline batteries include AAA, AA, C, D and 9V (LR03, LR6, LR14, LR20 and 6LR61, respectively), and standard dimensions are laid down for all of these types. Thus, whichever battery is chosen must fit within a given volume, thereby limiting the maximum amount of ingredients which it is possible to put into any given cell.

Working against these constraints, battery manufacturers have, for example, substantially reduced the thickness of the cell walls, reduced the thickness of the seals, and changed the nature of the labelling of the cell, all in order to optimise the use of the internal volume of the cell.

When it becomes impractical to further increase the volume of the cell ingredients, battery manufacturers then have the problem of trying to further enhance performance and battery life through enhancing and/or changing the ingredients used, but there must, ultimately, be a limit.

In U.S. Pat. No. 5,283,139 ('139 or U.S. '139 hereafter), there is disclosed a cell in which increased performance is achieved by increasing the density of both the anode and the cathode, without increasing the amount of aqueous, potassium hydroxide electrolyte. If the volume of a given active ingredient cannot be increased, then increasing its density is a logical, straightforward means for increasing the discharge capacity of the cell.

Nevertheless, there remains a desire to provide better and better electrochemical cells.

It has now, surprisingly, been found that, contrary to expectations, substantial enhancements of cells, above and beyond those prepared in accordance with U.S. '139, is possible, with performances being increased by as much as 15%, or more, by optimising controlling KOH concentration, in contrast to U.S. '139. In particular, alkaline electrochemical cells containing no added mercury and having a concentration of potassium hydroxide in the electrolyte, prior to discharge, of between about 34 and 37% (w/w solution) and wherein the amount of electrolyte is such that, after a calculated level of one electron discharge of the manganese dioxide, the calculated concentration of potassium hydroxide is between 49.5 and 51.5% (w/w solution), have superior performance in intermittent discharge tests.

Thus, in a first aspect, the present invention provides an alkaline electrochemical cell containing no added mercury and comprising an aqueous potassium hydroxide electrolyte, a zinc-containing anode and a manganese dioxide-containing cathode, characterised in that, prior to discharge, the concentration of potassium hydroxide in the electrolyte is between about 34 and 37% (w/w solution) and the amount of electrolyte is such that, at a calculated level of one electron discharge of the manganese dioxide, the calculated concentration of potassium hydroxide is between 49.5 and 51.5% (w/w solution).

Cells of the present invention are of particular use in intermittent-use devices, especially for such applications as tape recorders, electronic games and toys. These are characterised by internationally accepted tests. For high drain applications, cells of the invention still provide an advantage, although not usually to quite the same extent as for intermittent use applications.

It is particularly preferred that, at a depth of discharge of one electron, i.e. after the cell has discharged to a level of 1 electron as described below, any cell has a calculated KOH concentration of about 50% w/w. Above 50%, KOH crystallises out rapidly, removing both KOH and water from the electrolyte solution, as each molecule of KOH takes two molecules of water of crystallisation. Cells having a calculated final concentration of KOH much above 50%, therefore, fail quickly.

As noted above, the final concentration of potassium hydroxide (KOH) has a very substantial impact on the performance of the cell. At the point of completion, the concentration of KOH, as calculated for the whole cell, should not exceed a value of greater than about 51.5%. More preferably, this should be no greater than 51%, with about 50.6% being around the optimum value. Values of less than 50.6% are acceptable, down to and including about 49.5%, but much less than this also reduces the possibility for enhancement, as discussed below.

What is surprising is that there is no need to take any account whatever of the so-called 2nd electron reaction. This reaction generally takes place after the first electron reaction, and can yield extra power from the cell. However, for optimisation of the cell, it has now clearly been established that no account need be taken of the 2nd electron reaction, as described in more detail, below.

Cells having a calculated final concentration of KOH much below 50% will generally be inefficient, with water taking up room better taken up by active ingredients. In addition, if KOH is too dilute, then the inefficiency can be further compounded, as detailed below.

It is important that the final concentration of KOH does not exceed about 50% after one electron discharge. This rule applies, regardless of the extent to which the cell is intended for discharge, or the rate at which it is discharged. Deviation from this rule has very significant repercussions on cell performance, and distorts experimental results obtained from changing other parameters, to the extent that it is impossible to derive meaningful conclusions when it is not observed.

Recognising that the final concentration of KOH should be 50% after 1 electron discharge provides a firm rule for standardising electrochemical cells, so that it is now possible to establish relationships between all of the other ingredients of electrochemical cells. Values for the variables in the complex equation which makes up electrochemical cells can now be established, given that there is now available a fixed standard by which the remainder can be measured.

Previously, without the realization that it was crucial that the end concentration of KOH be in the region of 50% to maximise the performance of any given cell, varying the constituents of any of the components of the cell almost invariably had an effect on the final concentration of KOH, so that the final performance of the cell was not only related to the parameter varied, but also to the final KOH concentration. Thus, the results were empirical and generally meaningless.

However, provided that cells are manufactured which adhere to the principle that the final KOH concentration should be in the region of 50% after one electron discharge, then it is now possible to optimise the other features of the cell, as it is now possible to change only one parameter at a time, by keeping final KOH constant.

In cells of the present invention, the concentration of potassium hydroxide in the electrolyte is between about 34 and 37% (w/w solution), prior to discharge. By "prior to discharge" we mean that the cell is in the condition intended for use by the user, after all manufacturing steps. Manufacturing may include a small amount of discharge, e.g., during electrical testing. Within the range of 34 to 37%, it is preferred to select the staring concentration such that the final concentration be in the region of 50%.

Thus, there is further provided a cell as defined above which, prior to discharge, has a KOH concentration selected such that, after the cell has been discharged to a depth of discharge of one electron, the calculated KOH concentration is about 50% w/w.

The majority of alkaline cells currently on the market employ 38% KOH, but it has now been established that around about 36%, or slighter lower, provides a significant increase in the performance of the cell, and can readily be tied in with in an increase in the other components in the cell. Also, as noted above, use of concentrations too far either side of 36% is inefficient, requiring the use of excess water. It should, however, be noted that this concentration may alter depending upon the presence or absence of other soluble species in the cell.

It has also surprisingly been found that the principles outlined above even apply in the half cell reaction. In particular, in the high drain continuous tests, although the cell reaction terminates substantially before the manganese dioxide is exhausted, cells still perform much better where the concentration of KOH at the calculated point of completion is 50.6%, than when the concentration at the calculated point of completion varies substantially from this.

Applying these newly discovered principles, therefore, allows the person skilled in the art to optimise the amount and concentration of the electrolyte in accordance with scientific principles, thereby also permitting optimisation of the remainder of the active ingredients, such that performance increases in both high drain and low drain tests of over 10%, even as much as 15%, possibly more, are readily achievable.

Previously, it had not been possible to glean information, such as the impact of porosity changes, from data obtained from experimental cells, owing to the complications presented by the uncertainty of the relationship of each constituent to the other. In particular, the only previous certainty was that there should be sufficient water present, in the form of potassium hydroxide solution (referred to as "electrolyte" herein and in the industry) to enable the electrochemical reaction to take place. This is illustrated in U.S. '139, where every attempt is made to maximise the quantity of "active" ingredients, without taking any particular note of the amount of electrolyte.

Thus, in the past, sufficient electrolyte was incorporated to wet the cell ingredients and to allow the reaction to take place, but there was little consideration as to the overall effects of the electrolyte and, once again, final quantities of electrolyte were determined once ratios of other components had been ascertained.

However, taking the above principles into account, it is possible to determine exactly how much electrolyte to use, and at what concentration, in any given cell, so that, by making this a known factor, other parameters can, for the first time, be compared directly. For example, an increase in the total amount of manganese dioxide requires a concomitant increase in the electrolyte, in order that any comparison between the amount of manganese dioxide and zinc can be valid.

Thus, it is now possible to ascertain the relationship between manganese dioxide and zinc directly, and thus determine how to maximise performance.

The general, alkaline cell reaction scheme is as follows:

$$Zn + 2MnO_2 + H_2O \rightarrow ZnO + 2MnOOH \tag{I}$$

Although the manganese compound is shown as $MnO_2$, as is conventional, it is well understood by those skilled in the art that manganese dioxide is non-stoichiometric, and the actual formula is approximately $MnO_{1.96}$. Accordingly, the actual number of electrons involved in this reaction is approximately 0.925. This is referred to herein, as is also conventional, as "1 electron", or 1 e.

The reaction shown in scheme (I) above, generally referred to as the "first electron reaction" is not necessarily the only reaction to occur, and it may be followed by a second electron reaction (the $2^{nd}$ electron referred to above), in which the MnOOH is converted to $Mn(OH)_2$. This second reaction is usually only significant where cells are severely depleted. It appears to have very little, or no, effect on the requirement for a 50% final KOH concentration after 1 e discharge (first electron reaction), and cells optimised for 50% KOH after 1 e perform better, regardless of whether they proceed to the second electron reaction. Thus, herein, only the first electron reaction is taken into account. Any references herein to the "point of completion" mean the point at which the first electron reaction, or 0.925 electron in stoichiometric terms, has gone to completion (i.e., $Mn^{+3.925}$ is reduced to $Mn^{+3.0}$).

By way of illustration, on a discharge plot of voltage as a function of time, the ampere hours are measured by calculating the area under the discharge line which, in the case of manganese dioxide, originally tends to form a very substantial shoulder and then plateau's off very sharply, after which point it is occasionally possible to observe removal of the second electron. One electron discharge corresponds to the juncture of the bottom of the shoulder and the beginning of the plateau. Although this plateau occurs at a voltage below that considered as failure for most cells, the drop to this point is generally steep, and the calculations of 1 electron for the purposes of the present invention are unaffected.

It can be seen from the above equation that there must be sufficient water present to allow the reaction to go sufficiently to completion to be considered full discharge. The above reaction scheme takes place in the presence of a strongly alkaline solution, a solution of potassium hydroxide being currently preferred by cell manufacturers.

From the above, it will be understood that the "final concentration" of KOH (i.e., at the end of the first electron discharge) is a calculated one. However, applying reaction scheme (I) above, the final whole cell concentration of KOH is readily calculable, provided that both the initial concentration of KOH and the electrolyte volume are known.

In practice, calculating the final KOH concentration, based on this principle, means that it is neither necessary to discharge a cell by 1 electron, nor to measure final KOH concentration, whether in the anode, cathode, or both.

Accordingly, preferred cells can be designed and manufactured with considerable ease, as starting amounts of active materials are readily assembled and adjusted to yield a suitable, final, calculated concentration of KOH at 1 electron discharge.

Similar considerations also apply to the concentration of KOH at the beginning, before the cell has been discharged. Reaction Scheme I (supra) shows that the electrode reaction consumes one molecule of water for every two molecules of manganese dioxide consumed. However, a different reaction applies much below about 36% KOH.

Much below about 36% KOH, the reaction scheme changes to $$Zn + 2MnO_2 + 2H_2O \rightarrow Zn(OH)_2 + 2MnOOH \quad (II)$$

Thus, until the amount of KOH increases to about 36%, the reaction is inefficient, as more water than is necessary is being consumed, so that the point of completion of 50.6% is either reached too early, or more water than is necessary is present in the cell, thereby excluding other active ingredients. The former is generally more undesirable than the latter, as full discharge cannot be achieved.

Zinc oxide (ZnO) has previously been incorporated into the cell, either in the electrolyte, which is not especially efficient, or into the cathode, as it was found that the ZnO in the anode primarily served to plate the current collector, thereby protecting it. It has been conventional to add around 3% w/w zinc oxide to the whole cell. However, it is more efficient to add it to the anode only, in which case about 0.05% w/w in the anode achieves similar results.

When considering starting concentrations of KOH, it is generally assumed, herein, that cells start with 0% ZnO concentration in the cathode. However, it has been established that ZnO affects the starting concentration of KOH, insofar as a higher starting KOH concentration is needed to still reach a final concentration of about 50%. Accordingly, if 3% ZnO w/w whole cell (by incorporation with electrolyte) is used, then the starting KOH concentration is preferably about 37% w/w solution, if it is 2% w/w, then between 36 and 37% w/w solution is preferred, and at 1%, 35–37% w/w solution is the preferred range.

As noted above, the concentration of KOH rises during the lifetime of the cell, with an effective cut-off at just over 50.6% KOH, after which the cell fails quickly. The more water there is in the cell, the higher the starting concentration of KOH there can be, assuming a point of completion of 50.6%. If the initial amount of water is reduced, then the concentration of KOH must also be reduced, if it is intended not to exceed the point of completion of 50.6%.

The calculation of final KOH will depend on the starting characteristics of the cell. When a cell is first constructed, the following are known:

| | |
|---|---|
| The weight of $MnO_2$ in the cell | $w_1$ |
| The initial weight of electrolyte in the cell | $w_2$ |
| The average initial KOH concentration in the cell | $z_1\%$ |

The final KOH concentration (i.e., at the end of the 1 e discharge) is calculated based on the assumption that all of the $MnO_2$ is discharged to MnOOH. It does not matter whether this is true, as it has been found that the advantages of designing a cell to have a final KOH concentration of about 50% are still obtained, regardless of the final depth of discharge of the cell.

Which cell reaction applies is dependent on the average initial KOH:

$$2MnO_2 + 1H_2O + Zn = 2MnOOH + ZnO \quad (I)$$

$$2MnO_2 + 2H_2O + Zn = 2MnOOH + Zn(OH)_2 \quad (II)$$

The calculations herein assume 100% Reaction (I) occurs when initial OH⁻ is >8N and that 100% of Reaction (II) occurs when initial OH⁻ is <6N. It will also be appreciated that the exact initial KOH concentration upon which the 8N and 6N calculations are based will depend on what else is dissolved in the KOH, such as ZnO or silicate, for example.

For example, everything else being equal, at 0.05% w/w ZnO in the anode, >8N OH⁻ corresponds to >36% initial KOH, and <6N corresponds to <29%; at 3% ZnO dissolved in the KOH throughout the cell, then >8N OH⁻ corresponds to >38% initial KOH, and <6N OH⁻ corresponds to <31% initial KOH; while, if nothing else is dissolved in the electrolyte (only KOH), then >8N OH⁻ corresponds to >34% initial KOH and <6N corresponds to <27% initial KOH.

It is assumed that for any pH between 6–8N OH⁻ that the change from Reaction (I) to Reaction (II) occurs linearly.

Thus: Calculation of final KOH conc.

| 100% Reaction (I) | 0% Reaction (II) | >8 N OH⁻ |
|---|---|---|
| % of Reaction (I) = | a% | = 100% |
| % of Reaction (II) = | (100 − a)% | = 0% |
| 0% Reaction (I) | 100% Reaction (II) | <6 N OH⁻ |
| % of Reaction (I) = | a% | = 0% |
| % of Reaction (II) = | (100 − a)% | = 100% |
| 50% Reaction (I) | 50% Reaction (II) | 7 N OH⁻ |
| % of Reaction (I) = | a% | = 50% |
| % of Reaction (II) = | (100 − a)% | = 50% |

Wt. of $H_2O$ consumed by Reaction (I)=[(No. of electrons)×(a/100)×(0.5×Mol. Wt Water)]/(Mol. Wt $MnO_2$)×$w_1$=$w_3$ Wt. of $H_2O$ consumed by Reaction (II)=[(No. of electrons)×(100−a)/100]×[(1.0×Mol. Wt Water)/(Mol. Wt $MnO_2$)×$w_1$]=$w_4$ The above equations are empirical, but results generally accord with these equations.

| | |
|---|---|
| No. of electrons = | 0.925 |
| Mol. Wt of Water = | 18 |
| Mol. Wt of $MnO_2$ = | 86.93 |
| Final Wt of electrolyte = | $w_2 - w_3 - w_4 = w_5$ |
| Wt. of KOH solid = | $z_1/100 \times w_2 = w_6$ |
| Final KOH concentration = | $w_6/w_5 \times 100$ |

It will be appreciated that the amount of $MnO_2$ and zinc will generally be kept at a constant capacity ratio, so that a change in one will result in a concomitant change in the other. The ratio may be any that a given manufacturer might want to employ, and is anywhere in a range of about 1.2:1 to about 1.4:1 anode to cathode (A:C ratio). It is assumed herein that, when discussing varying parameters of either electrode, the overall ratio of anode capacity to cathode capacity is maintained. Preferred cells of the present invention have an A:C ratio of 1.33:1 and, unless otherwise indicated, discussions herein assume this ratio, although other ratios are envisaged and included, mutatis mutandis.

As used herein, electrode capacity is the theoretical capacity of the electrode in ampère hours (Ah). Unless otherwise indicated or apparent, the specific capacity values used herein are, for electrolytic manganese dioxide, 0.285 Ah/g for a 1 electron discharge, and, for zinc, 0.820 Ah/g.

As a guide, it is preferred that the ratio of cathode capacity:cell volume for cells of the present invention is in the range of 0.47 to 0.50 Ah/cm³, when cathode capacity is calculated in accordance with the 1 electron principle described hereinbelow. When using the principle assumed in U.S. '139, then this same ratio translates to approximately 0.61 to 0.65 Ah/cm³.

In a preferred embodiment, then, there is provided a cell of the invention wherein the ratio of cathode capacity:cell volume is in the range of 0.47 to 0.50 Ah/cm$^3$, when cathode capacity is calculated in accordance with the 1 electron principle.

Thus, in the context of an AA, or LR6, cell, the advantages of the present invention are particularly observed when the capacity of the cathode is equal to or greater than 2.9 Ah. Below this point, performance tends only to be equivalent to that of the art, although advantages may be observed in reduced quantities of active ingredients.

Accordingly, in a preferred embodiment, there is provided an LR6 cell of the invention which has a cathode capacity of at least 2.9 Ah.

Also in relation to LR6 cells, and taking the above ratios into account, it becomes substantially difficult to exceed a cathode capacity of 3.1 Ah. In general, the range of 2.9 to 3.1 Ah provides very significantly enhanced LR6 cell performance in ANSI/IEC tests, and is particularly preferred.

The actual weight of zinc used is calculated from the actual weight of manganese dioxide following the principles described above. The percentage concentration of zinc in the anode gel, or paste, is calculated independently. Thus, higher concentrations of zinc in the gel lead to a lower internal diameter of the cathode, as the gel can be prepared in smaller quantities. However, performance on high rate discharge also reduces with reduced contact area between the anode and the cathode. For this reason, ascertaining the desirable concentration of zinc to use in the anode paste was rendered complex.

It is known that cell performance can be maximised by incorporating a certain amount of zinc flake into the anode mix. The disadvantage is that zinc flake is difficult to handle under manufacturing conditions. Instead, it has been found that increasing the amount of zinc in the anode paste from around about 67% to 74% (w/w) eliminates the need to incorporate any zinc flake, and no advantage is seen when using flake. In terms of porosity, no flake is necessary at a porosity of 66% or lower. However, as described hereinbelow, where it is desired to increase the porosity of the anode, then it is convenient, and preferred, to employ flake above porosities of 66%, and at a rate of about 1% per 1% increase in porosity.

It has been found that increasing the porosity of the anode up to about 70% serves to increase the efficiency of the anode and gives better performance characteristics of the cell.

It will be appreciated that, with increasing porosity of the anode, the theoretical capacity of the anode will necessarily drop, assuming constant volume. However, loss in capacity is more than compensated by the increase in performance of the cell for a short range. This effect eventually diminishes, and there appears to be little additional improvement to be gained by increasing anode porosity much beyond 70%, although it will be appreciated that the point above which little or no benefit can be seen will depend on the overall characteristics of the cell. In general, this point appears to be around 71% to 76% and, particularly, 72% to 74%. Above a porosity of 74%, any increase in efficiency of the cell to be obtained by further increasing porosity is generally outweighed by loss in performance.

Accordingly, while it will be appreciated that the anode porosity is not critical to the present invention, cells in which the anode, porosity is between 69 and 76% are preferred. More preferred porosities are in the range 70–74%.

The porosity of the anode may be increased in any suitable manner. This may be achieved, for example, by increasing the internal diameter of the cathode, thereby increasing the volume of the anode, while keeping the same amount of zinc. If the volume of the anode is not increased, then the amount of zinc and, concomitantly, the amount of cathode material, must be reduced in order to reduce the anode porosity, unless a deliberate decision is taken to vary the A:C ratio.

Above a porosity of about 66%, the anode preferably comprises a proportion of non-granular zinc. Such zinc may simply be any form with greater surface area than normal powdered zinc used in cells. For example, zinc flake is useful, but other 2-dimensional and 3-dimensional shapes are useful. Such zinc overcomes the problem of loss of electrical path in the zinc with separation of the zinc particles at higher porosities. A zinc flake content of about 5% w/w is sufficient to compensate for loss of conduction path up to about 73% porosity. In general, a flake content of at least 0.6% w/w, up to about 1% or higher, per 1% increase in porosity of the anode over 66% is desirable, although it will be appreciated that the skilled person may employ as much flake as desired. Any reduction in zinc in the anode may be compensated by other anode ingredients, as appropriate.

The term "porosity", as used herein, relates to the volumetric amount of non-solids in the anode. Solids are those components that are insoluble under conditions pertaining in the assembled cell, and will generally only comprise zinc and indium hydroxide, where present. The other anode components are usually soluble in the electrolyte solution, including gellants. Components which are soluble in the electrolyte need not be considered as solids when calculating porosity. Where a portion of an ingredient is insoluble, such as where the electrolyte is saturated, it is not necessary to include the insoluble portion as a solid when calculating the anode porosity; the entire amount of that ingredient is excluded. In any event, the amount of gellant in the anode is generally so small that, to most intents and purposes, it can be discounted when calculating porosity.

Although the present invention is not concerned with the porosity of the cathode and that, in addition, the porosity of the anode is not critical to the invention, it will be appreciated that an understanding of the porosity of each electrode greatly simplifies the calculations necessary to determine the KOH concentrations of the cell, either to determine concentration in a cell "off the shelf" or to assist in determining the correct concentration and amount of KOH electrolyte needed to make a cell of the invention. Accordingly, the following is an illustration of how to determine and otherwise consider porosities of electrochemical cells.

As noted above, by "porosity" is meant the relative amount, v/v, of the electrode in question that is not taken up with solids. As the solids content, volumewise, is generally easier to calculate than the non-solids, and also because porosity includes any trapped air, for example, then the calculation to determine percent porosity is generally expressed as $$[(V_\Sigma - V_S)/V_\Sigma]*100$$

wherein $V_\Sigma$ is the measured total volume of the electrode and $V_S$ is the volume of the solid component.

The volume of the solid component is not, generally, measured directly, but calculated as the product of weight over density. For the purposes of porosity, it will be appreciated that a given solid substance is quite likely already to possess a certain degree of porosity, such as chemical manganese dioxide (CMD) which can have porosities in excess of 50%, for example.

Thus, in order to more reliably calculate electrode porosity, the theoretical porosity of the substance is used. This is calculated based on molecular structure and 3-D arrays, and takes no account of any porosity that might result from the method of manufacture. Accordingly, for these purposes, both electrolytic manganese dioxide and chemical manganese dioxide (EMD and CMD, respectively) are considered to possess the same theoretical density. If the actual, apparent density of the substance were employed in the porosity calculations, then the resulting, calculated porosity of the electrode would take no account of porosity introduced with the solids, and would, at best, be misleading and, at worst, meaningless.

Theoretical densities assumed for the electrodes in the present invention are as follows:

| Cathode | | | |
|---|---|---|---|
| Component | Theoretical Density | Wt per 100 g | Vol. per 100 g |
| EMD | 4.53 ($d_1$) | $w_1$ | $v_1 = w_1/4.53$ |
| CMD | 4.53 ($d_2$) | $w_2$ | $v_2 = w_2/4.53$ |
| Graphite | 2.25 ($d_3$) | $w_3$ | $v_3 = w_3/2.25$ |
| COATHYLENE ® | 0.92 ($d_4$) | $w_4$ | $v_4 = w_4/0.92$ |
| 40% KOH | 1.39 ($d_5$) | $w_5$ | $v_5 = w_5/1.39$ |
| Another components | $d_6$ etc. | $w_6$ etc. $\Sigma = 100$ | $v_6 = w_6/d_6$ etc. |

| Anode | | | | |
|---|---|---|---|---|
| Component | Type | Theoretical Density | Wt per 100 g | Vol per 100 g |
| Zinc⁺ | Solid | 7.14 ($d_7$) | $w_7$ | $v_7 = w_7/7.16$ |
| Carbopol 940 | Liquid | 1.41 ($d_8$) | $w_8$ | $v_8 = w_8/1.41$ |
| Indium hydroxide | Solid | 4.60 ($d_9$) | $w_9$ | $v_9 = w_9/4.60$ |
| ZnO | Liquid | 5.61 ($d_{10}$) | $w_{10}$ | $v_{10} = w_{10}/5.61$ |
| 36% KOH | Liquid | 1.35 ($d_{11}$) | $w_{11}$ | $v_{11} = w_{11}/1.35$ |
| Component x | ? | $d_{12}$ | $w_{12}$ | $v_{12} = w_{12}/d_{12}$ etc. |

COATHYLENE ® is polyethylene
In which 'x', '?' and 'etc.' allow for any further component(s), which may be solid or liquid.

Accordingly, the theoretical volume of the cathode is the sum of all of the ingredients=$V_\Sigma = \Sigma(v_1:v_6) = (v_1+v_2+v_3+v_5+v_6$ etc.).

Likewise, the theoretical volume of the anode=$V_T = v_7 + v_8 + v_9 + v_{10} + v_{11} + v_{12}$ ...

For the avoidance of doubt, the actual cathode volume of a cylindrical cell can be calculated from knowing the height of the cathode (H), and the internal and external diameters of the cathode (ID and OD, respectively). In the present invention, it is preferred to manufacture the cell using a stack of cathode pellets, so that H=Height of stack of pellets In a specific example, which is for illustration only, cathode diameters are as follows:

| | Pellet as manufactured | In can |
|---|---|---|
| Cathode OD | 1.345 = $OD_p$ | 1.335 = $OD_c$ |
| Cathode ID | 0.900 = $ID_p$ | 0.885 = $ID_c$ |

$$\text{Thus, Actual Volume} = V_A = H \cdot \pi \cdot \frac{(OD_c^2 - ID_c^2)}{4}$$

$$\text{While, Theoretical Volume} = V_A = H \cdot \pi \cdot \frac{(OD_p^2 - ID_p^2)}{4}$$

In the above case, whether the cathode pellet is as manufactured or "in can", the product of $OD^2 - ID^2$ is 0.999. This is because, in this instance, and as preferred in the present invention, the pellets are designed to be interference-fitting within the can, so that, on insertion, the pellets are compressed. Because this does not affect the volume, then there must be a concomitant reduction in the internal diameter to compensate for the reduction in external diameter, in order that the volume remain unchanged.

For cells with non-cylindrical cathodes (e.g., prismatic cells, cells with spiral wound or flat electrodes, cathodes with tapered walls, and cathodes with non-cylindrical anode cavities), the method of calculating the volume is adapted to the specific design of the cell. For the avoidance of doubt, if there are other components within the cathode (e.g., current collectors), or if there are gaps or other components between sections of the cathode (e.g., layers of separator between stacked cathode pellets), then those gaps and/or other components do not form part of the cathode volume.

In the cathode, the Theoretical Volume of Solids=$V_s = v_1 + v_2 + v_3 + v_4$.

Thus, $$\text{Cathode Porosity} = \frac{(V_A - V_s)}{V_A} \times 100$$

In the anode, $V_L$=Volume of Liquids=$v_8 + v_{10} + v_{11}$
$V_S$=Volume of Solids=$v_7 + v_9$
so that the $$\text{Theoretical Anode Porosity} = \frac{(V_T - V_s)}{V_T} \times 100 = \frac{V_L}{V_T} \times 100$$

and it is the theoretical porosity to which the anode paste is made up, and to which the present invention pertains.

In the case of the anode, there tends to be a substantial difference between the theoretical volume and the actual volume depending, to a certain extent, on the method used to fill the anode basket. In the embodiment under discussion, the basket comprises the separator fitted into the anode cavity in the cathode.

Methods used to fill the anode basket are generally one of two. The first is top filling, the second bottom filling. The former involves dropping in the anode paste generally from the vicinity of the top of the basket. The latter generally involves inserting a dispensing tube into the basket and injecting anode paste at a rate equivalent to withdrawal of the tube, withdrawal of the tube being generally effected or assisted by the force of the expulsion of the paste from the tube.

With top filling, more air tends to be trapped in the anode than with bottom filling. In any case, the trapped air, or anode deadspace, is usually at least 5% v/v and anywhere up to about 17%. Using bottom filling, the margins are between about 5% and 10% while, with top filling, the margins are between about 8% and 17%.

The porosity of the anodes of the present invention is not dependent on the anode deadspace, and a simple core of the anode will substantially yield the porosity to which the anode was made. Thus, the porosity of the present invention applies to the anode paste before being placed in the cell.

In a cell "off the shelf", there will be an anode deadspace as noted above, generally in the region of about 10%. In order to establish the porosity of the anode, the most accurate method is to take a core sample, and perform the analysis described below. As a rougher guide, however, the anode deadspace found in most cells is about 10%. Variations from this amount provide porosities largely within experimental error, as an anode deadspace of about 10% gives an overall increase in anode porosity of about 3% compared with an anode deadspace of 0%. Thus, if an anode deadspace of about 10% is assumed, and standard bottom filling in a manufacturing facility yields about 9% anode deadspace, while standard top filling in such a facility yields an anode deadspace of about 12 or 13%, then it will be appreciated that, assuming a deadspace of about 10% will yield a porosity tolerance of ~1%.

In making up cells of the present invention, the theoretical volume of the components of the anode is first calculated, per 100 g of total components. The volume of the anode basket is then established, which will vary from the internal space defined by the cathode according to the volume of separator material used. This volume is then reduced by 10% to adjust for anode deadspace, and this is the volume of anode paste used.

Thus, if porosity is simply taken as a measure of the total solids in relation to the volume in the basket, then the resulting, apparent porosity of the anode, assuming 10% deadspace, will be about equal to [theoretical porosity/(100−10)]*100. In other words, apparent porosity theoretical porosity+~11%

As a rough guide, then, the actual porosity of the anode from a cell off the shelf will be equal to about the apparent porosity divided by 1.11. However, as noted, this will depend on the deadspace of the cell. As noted above, the porosity to which the present invention pertains is the porosity of the anode itself, and not the porosity of the anode+deadspace.

The anode fill volume, in the present example, despite being reduced by 10%, generally results in a fill of anode paste to generally the same height as the top of the cathode pellets. It will be appreciated that the amount of 10% may need to be modified according to anode fill techniques employed by those skilled in the art. In practice, the deadspace is filled with electrolyte, whether this enters after filling, or whether electrolyte is already present in the basket prior to filling, as part of the overall electrolyte needed in the cell of the invention. In any event, the anode deadspace is taken up with electrolyte, either straightaway, or after dispersion of the air.

In any event, the level of the anode paste should be about the same height as the cathode material. If the heights are different, especially if the anode is lower than the cathode, then high drain performance is adversely affected. Thus, a difference of no greater than 2.5% in nominal height is envisaged, in relation to cathode height. If there is a differential, then it is preferred that the anode be higher than the cathode, but preferably only by a small margin, and preferably no more than 2.5%.

It will be appreciated that the amount of anode paste, after the 10% adjustment, will need to contain the appropriate amount of zinc to maintain the anode:cathode Ah ratio which, in the present example, is assumed to be 1.33. Where other ratios are applied, then suitable adjustments to volumes, for example, need to be made, but the principles of the invention remain unchanged.

In a cell "off the shelf", porosities may be determined readily. Essentially, it is necessary to first determine the volumes of the electrodes, then to establish their solids content. In the case of determining the KOH content, this can be established by assaying the various components of the cell and then combining the results.

The amount of water can be established by the use of a modified Dean & Stark method. Apparatus is available from Quickfit & Quartz Ltd., for example. The sample is covered with dry toluene and refluxed for 45 minutes, ensuring that a majority of the condensation takes place in the water-cooled condenser. Water is collected in a measuring cylinder or cuvette disposed under the condenser to catch the run-off. This method is modified by bubbling $CO_2$ gas through the boiling toluene, in order to convert KOH to $K_2CO_3$, otherwise not all water can be collected, as some stays behind with the KOH as water of crystallisation.

The amount of $OH^-$ is readily determined by soxhleting each component separately with water to obtain a solution containing KOH and water. All samples are combined, made up to a known volume, and then titrated for $OH^-$ by standard methods. For example, HCl of known molarity, together with phenolphthalein as an indicator, may be used. In this method, it is assumed that all $OH^-$ is KOH, and weights are calculated accordingly.

Together with the volume of water and the amount of $MnO_2$ (calculated as described below), it is then within the abilities of the skilled person to establish that a given cell satisfies the criteria of the present invention.

Returning to electrode porosities, and as noted above, these are calculated essentially as follows:

[(Total volume−Solids volume)/(Total volume)/]*100

More specifically, the volumes of the electrodes may be determined in any suitable manner. It is preferred to establish the volume in situ, and this is preferably achieved by the use of X-rays, which may be used to give a clear indication of the internal proportions of the cell, especially anode and cathode height and width. This done, the cell can then be cut open, and the electrodes separated.

As a generality, for example, with the cells illustrated in the accompanying Examples, what we have found is that, in the anode, only the zinc needs to be considered while, in the cathode, only the manganese dioxide (EMD and CMD, where present) and carbon (usually graphite) need to be considered, when determining porosities. The remaining components are either present in vanishingly small quantities, are both not particularly dense and present in small quantities, or form part of the electrolyte, so that even if account is made for these components, the difference they make is lost in the margins of error.

Accordingly, in the anode:
Measure dimensions of internal volume of anode basket
Measure height of anode in basket from X-ray of cells
Remove all anode material and wash zinc with water to remove gellant and electrolyte
Wash with ammonium hydroxide solution to leave just zinc
Weigh zinc
Volume of zinc=weight of zinc/7.14
Porosity=[(0.9*Volume basket−volume zinc)/(0.9*volume basket)]*100

It will be appreciated that the 0.9 accounts for the 10% deadspace. If necessary, the deadspace may be calculated by careful washing of the anode pellet to remove gelled electrolyte, and determining the remaining volume of the anode.

In the cathode:

Measure dimensions of cathode from X-ray and observation before removing cathode from can (Cathode OD, Cathode ID, Cathode Height determined)

Wash cathode with water to leave EMD/CMD, graphite and binder. Binder ignored as minor component and does not significantly affect cathode volume (less than error resulting from measurement)

Weigh solids

Dissolve MnO₂ out of solids by a mixture of 50% w/v aqueous HCl to leave graphite residue Weigh graphite MnO₂ weight=solids weight−graphite weight Volume of MnO₂=Weight of MnO2/4.53

Volume of graphite=Weight of Graphite/2.25

Porosity of cathode=[(cathode vol.−MnO₂ vol.−Carbon vol.)/cathode vol.]*100

It will be appreciated that more sophisticated chemical or mechanical methods may be used, if desired, and are well within the ability of a person skilled in the art.

It will be apparent that the zinc component, for example, may comprise more than one component (powder and flake) as may the manganese dioxide (EMD and CMD), but this has no practical effect on determination of porosity.

It will also be appreciated that the density of the KOH solution, or electrolyte, will vary according to KOH content. However, KOH solution density is not important to the present invention. In general, densities of compounds can be found in the Handbook of Chemistry & Physics.

In the cathode, it is necessary to use conductive material, which is normally graphite. For any given combination of MnO₂ and graphite types and morphologies, a minimum constant volume percent carbon content in the cathode can be established which will provide adequate electrical conductivity in the cathode. Volume percentages can be converted to weight percentages using the real densities of the materials. In an example, when using GHU EMD and Superior Graphite GA17 expanded graphite, an EMD:graphite weight ratio of at least 20:1 is preferred.

Manganese dioxide of battery grade should be used in the present invention, and this may be from chemical, electrolytic or natural sources, with electrolytic most preferred, followed by chemical. Manganese dioxide exists in a number of different crystalline structures, commonly called, "α", "β", "γ", "δ" etc. We prefer to use the γ form, and any MnO₂ calculations herein are based upon the use of this form. Where manganese dioxide of another crystalline structure is used, the point of completion of the reaction may need to be calculated on the basis of different assumptions, in particular in relation to the meaning of "1 electron". In particular, the endpoint may be taken to be at the juncture between the main discharge curve and the plateau occurring at a voltage of less than 1.0. In the case of the γ form of MnO₂, this endpoint is calculated as being when all manganese is Mn$^{+3.0}$.

Where other materials or reactions (for example, co-cathodes) that consume water in the course of discharge are present in the cell, allowance should be made for the water consumed by these materials or reactions. Materials involved in the cell reactions that do not consume water may be disregarded for the purposes of these calculations.

It has been found that particularly useful separators for use in the present invention employ separators comprising a copolymer of:

(1) an ethylenically unsaturated carboxylic acid of formula (I):

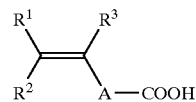

(I)

(where: R¹, R² and R³ are the same as or different from each other and each represents a hydrogen atom, an alkyl group having from 1 to 10 carbon atoms or an aryl group; and A represents a direct bond or an alkylene group having up to 8 carbon atoms) or a salt or ester thereof; and (2) an aromatic compound of formula (II):

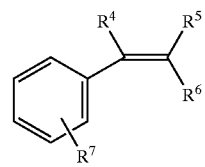

(II)

(where: R⁴, R⁵ and R⁶ are the same as or different from each other and each represents a hydrogen atom, an alkyl group having from 1 to 10 carbon atoms or an aryl group; and R⁷ represents a sulphonate or carboxylate group and balancing cation) or the separator comprises a homopolymer of said aromatic compound of formula (II). In general, it is preferred that A is a direct bond and R¹–R⁷ are all hydrogen.

The copolymer may be used by itself as a separator, in which case it is preferably used to form the separator in situ in the cell, or it may be used as a coating on a porous substrate (for example traditional separator paper), in which case it can allow thinner paper and/or fewer layers to be used.

Particularly preferred copolymers are those comprising acrylic or methacrylic acid and a styrenesulphonate, and most preferred is a copolymer of acrylic acid and a styrenesulphonate, optionally with one or more other monomers, but preferably without. Most preferred is a copolymer of acrylic acid and sodium styrenesulphonate. Alternatively, a homopolymer of sodium styrenesulphonate may be used.

Where the copolymer or homopolymer alone is to be used as a separator, it is preferably sprayed as a solution or dispersion in situ in the cell. Thus, the cell is partially assembled, one of the anode and cathode being inserted into the cell housing. The solution or dispersion of the copolymer or homopolymer is applied, e.g. by spraying, onto that anode or cathode and allowed to dry, and then the other of the cathode and the anode is inserted into the cell, and the cell is completed.

Alternatively, and as used in the Examples herein, the copolymer or homopolymer is supported on a porous substrate of the type commonly used as a separator in electrochemical cell technology, also referred to herein as separator paper, although the substrate need not actually be paper. The copolymer or homopolymer may be applied as a coating to one or both sides, but preferably only one, for ease of application, or it may be soaked into the substrate. In either case, it is applied as a solution or dispersion and then dried (by removal of solvent, e.g. by evaporation), typically by steam drum drying, or coagulated as described above.

The apparatus used for coating may be any conventional coating apparatus, and many forms of such apparatus are available commercially. The apparatus used herein was a Dixon Pilot Coater, manufactured by T.H. Dixon & Co. Ltd., Letchworth, Herts, England, and this, or equivalent full scale apparatus, may be used in practising the present invention.

In particular, the advantage of this type of separator is that a single layer of separator paper, coated or impregnated with this copolymer or homopolymer, is the only separator that is required to form a useful cell resistant to shorts. The art uses double layers of separator which, especially in smaller cells, takes up valuable space which could otherwise be given over to active material.

Any suitable or conventional separator material may be employed in the present invention. Examples of suitable materials include the mixtures of polyvinyl alcohol (vinylon), and mercerised hardwood fibre sold as VLZ75 and VLZ105 (respectively about 75 and 105 $\mu$m thick) by Nippon Kodoshi Corporation (NKK), the similar material sold by Hollingsworth and Vose and the mixture of lyocell rayon fibre, polyvinyl alcohol fibre, matrix fibre and binder fibre sold by Freudenberg.

Accordingly, in a preferred embodiment, there is provided an electrochemical cell comprising a single layer of separator paper, coated and/or impregnated with a copolymer, or homopolymers, as defined above.

Cells of the present invention as illustrated herein are assumed to have a volume of 6.2 ml, and to be AA cells, unless otherwise stated. However, it will be appreciated that the present invention extends to all cells, including AAAA, AAA, AA, C, D and 9V, for example, as well as other cell types. For example, the invention is equally applicable, for example, in: cells with any other external geometries (e.g., prismatic); cells with other electrode shapes or configurations (e.g., spiral wound electrodes, flat electrodes and other non-cylindrical electrodes); cells containing more than one anode and/or cathode section (e.g., multiple anode cavities within a cathode); and cells having non-uniform anode and/or cathode compositions (e.g., a cathode having a higher density in one area than another, or cathode pellets having different formulations, and electrodes having gradated densities). It will also be appreciated that suitable adjustments for capacity may need to be made. However, the principles of the present invention remain unaffected, regardless of cell type.

For example, the present invention may be applied in the same way, using the same ratios of cathode to anode volume, to other well known standard or non-standard cell sizes, such as AAAA whose available internal volume is approximately 1.35 ml, AAA whose available internal volume is approximately 2.65 ml, C whose available internal volume is approximately 20.4 ml and D whose available internal volume is approximately 43.7 ml.

It will be appreciated that many factors must be taken into account when constructing an alkaline electrochemical cell. In the present invention, it is assumed that the cell generally conforms to the principles of cell manufacture, and it is envisaged that the cathode is of a solid nature, rather than semi-solid. Any standard ingredients may be used in cells of the present invention, including binders and anti-gassing agents, for example. The accompanying Examples were formulated without binders.

The invention is further illustrated by the examples shown in the following Tables.

In Table 1, the A:C ratio is 1.33:1 and the initial concentration of KOH is 36%. The final concentration of KOH, after 1 e discharge, ranges from 45% to 57%. Likewise, the Ah, and any reference to Ah (Ampère hours) herein, is calculated based on the assumption that 1 e reaction goes to completion (0.925 e) but that the second electron reaction does not take place, so that capacity is predicated on the first, and main, reaction only. Unless otherwise specified, Ah relates to the capacity of the cathode. The separator used was a layer of VLZ75 paper coated with a copolymer of acrylic acid and sodium styrenesulphonate in a ratio of 20:80 w/w at a rate of 30 gsm. The $MnO_2$ used was GHU EMD and the graphite was Superior Graphite GA17 expanded graphite. Cathode porosity was 25.7%. The anode type was paste, comprising 0.05% ZnO.

The cells were subjected to the following tests, using a standard test machine Model No. BT2043 from Arbin Instruments, 3206 Longmire Drive, College Station, Tex. 77845, USA, and software MITS97, also from Arbin Instruments.

1A/Cont./1V0 ("1A" in Tables)

In this test, the electrochemical cells were discharged through a resistance of 1Ω at a constant current of 1 A continuously, until an endpoint voltage of 1 V was reached. The results are reported in minutes (m), under the column headed "1A".

3R9/1h/1d/0V8

In this test, the electrochemical cells were discharged at a constant resistance of 3.9Ω for 1 hours per day with a rest period of 23 hours per day, until an endpoint voltage of 0.8 V was reached. The results are reported in minutes (m).

43R0/4h/0V9

In this test, the electrochemical cells were discharged at a constant resistance of 43.0Ω for 4 hours per day with a rest period of 18 hours per day, until an endpoint voltage of 0.9 V was reached. The results are reported in hours (h).

TABLE 1

|  |  | 1 | 2 | 3 | 4 | 5 | 6 | 7 |
|---|---|---|---|---|---|---|---|---|
| Pellet Weight | g | 2.49 | 2.49 | 2.65 | 2.65 | 2.89 | 3.14 | 3.27 |
| % EMD |  | 93.71% | 93.71% | 93.71% | 93.71% | 93.71% | 93.71% | 93.71% |
| % Graphite |  | 4.69% | 4.69% | 4.69% | 4.69% | 4.69% | 4.69% | 4.69% |
| % KOH |  | 1.60% | 1.60% | 1.60% | 1.60% | 1.60% | 1.60% | 1.60% |
| No. of Pellets |  | 4 | 4 | 4 | 4 | 4 | 4 | 4 |
| Actual Pellet OD | mm | 13.45 | 13.45 | 13.45 | 13.45 | 13.25 | 13,25 | 13.25 |
| Actual Pellet ID | mm | 9.53 | 9.53 | 9.20 | 9.20 | 8.73 | 8.20 | 7.90 |
| Actual Pellet Ht. | mm | 10.80 | 10.80 | 10.80 | 10.80 | 10.63 | 10.63 | 10.63 |
| EMD Wt |  | 9.33 | 9.33 | 9.93 | 9.93 | 10.84 | 11.77 | 12.26 |
| Cathode Ah |  | 2.66 | 2.66 | 2.85 | 2.85 | 3.09 | 3.36 | 3.51 |
| Electrolyte Wt. | g | 1.72 | 1.72 | 1.72 | 1.72 | 1.72 | 1.72 | 1.72 |
| KOH Conc. | % | 36 | 36 | 36 | 36 | 36 | 36 | 36 |
| Anode Weight | g | 6.39 | 6.39 | 6.37 | 6.37 | 6.38 | 6.37 | 6.37 |
| % Zinc Powder |  | 61.00% | 51.70% | 65.30% | 60.67% | 71.00% | 77.10% | 80.00% |
| % Zinc Flake |  | 0.00% | 9.30% | 0.00% | 4.63% | 0.00% | 0.00% | 0.00% |

TABLE 1-continued

|  |  | 1 | 2 | 3 | 4 | 5 | 6 | 7 |
|---|---|---|---|---|---|---|---|---|
| Anode Porosity |  | 77.2 | 77.2 | 73.8 | 73.8 | 68.4 | 61.1 | 56.9 |
| Cathode Height |  | 43.2 | 43.2 | 43.2 | 43.2 | 42.5 | 42.5 | 42.5 |
| Final KOH Conc. |  | 45.3 | 45.3 | 47.0 | 47.0 | 49.9 | 54.2 | 57.4 |
| Final KOH Conc. NO Reaction change <36% Data |  | 45.3 | 45.3 | 47.0 | 47.0 | 49.9 | 54.2 | 57.4 |
| 43R0/4h/0V9 | hour | 82 | 82 | 88 | 88 | 95 | 104 | 108 |
| 3R9/1h/0V8 | min | 454 | 460 | 473 | 478 | 482 | 427 | 402 |
| 1A/Cont/1V0 | min | 40 | 53 | 46 | 52 | 51 | 41 | 35 |
| vs. Column 5 | % | 86.3% | 95.2% | 93.7% | 97.9% | 100.0% | 92.8% | 88.6% |

Table 1 generally shows the result of changing Zn powder with fixed starting KOH concentration. Columns 2 and 4 show the effect of adding Zn flake to anodes having less than 71% Zn powder. Good results, especially in the high drain continuous test, are obtainable with added flake. However, the best results are seen in column 5, with only 71%, but a finished KOH concentration of 49.9%. Columns 6 and 7 clearly show the rapid drop-off with final concentrations of KOH of over the limits of the invention.

It can be seen that, for an initial KOH concentration of 36%, the final KOH concentration varied from 45% up to 57%.

The 3R9/1h/0V8 performance (intermittent performance) peaked at 50–51% final KOH concentration. Although the cells of columns 6 and 7 had higher capacity than the cells of column 5, performance in this test was lower, because the final KOH concentration was too high.

The 3R9/1h/0V8 performance was lower at lower final KOH concentrations because the cell capacity was too low and, therefore, the Final KOH concentration was less than 50–51%.

The highest overall performance for Table 1 is seen in column 5, where the final KOH concentration is in accordance with the present invention.

TABLE 2

|  |  | 1 | 2 | 3 |
|---|---|---|---|---|
| Pellet Weight | g | 2.84 | 2.87 | 2.89 |
| % EMD |  | 94.80% | 94.80% | 94.80% |
| % Graphite |  | 3.60% | 3.60% | 3.60% |
| % KOH |  | 1.60% | 1.60% | 1.60% |
| KOH Conc. |  | 40 | 40 | 40 |
| No. of Pellets |  | 4 | 4 | 4 |
| Actual Pellet OD | mm | 13.45 | 13.45 | 13.45 |
| Actual Pellet ID | mm | 8.73 | 8.73 | 8.73 |
| Actual Pellet Ht. | mm | 10.80 | 10.80 | 10.80 |
| EMD Wt |  | 10.77 | 10.88 | 10.96 |
| Cathode Ah |  | 3.07 | 3.10 | 3.13 |
| Cathode Porosity |  | 27.9 | 27.2 | 26.5 |
| Electrolyte Wt. | g | 1.80 | 1.40 | 1.50 |
| Anode Weight | g | 6.65 | 6.7 | 6.6 |
| Anode Type |  | Paste | Paste | Paste |
| % Zinc Powder |  | 67.26% | 67.26% | 67.26% |
| % Zinc Flake |  | 7.47% | 7.47% | 7.47% |
| % ZnO |  | 0.04% | 0.04% | 0.04% |
| % Electrolyte |  | 24.91% | 24.91% | 24.91% |
| Separator |  | 2 layers of VLZ105 |  |  |
| Anode:Cathode Ah ratio |  | 1.33 | 1.33 | 1.33 |
| Anode Porosity |  | 64.1% | 64.1% | 64.1% |
| Cathode Height |  | 43.2 | 43.2 | 43.2 |
| Initial KOH Conc. | % | 36 | 34 | 31 |
| Total KOH Wt. | g | 1.31 | 1.11 | 1.03 |
| 100% Reaction 1 |  | >36% | >36% | >36% |
| 100% Reaction 2 |  | <29% | <29% | <29% |
| Final KOH Conc. Reaction change <36% |  | 50.6 | 53.0 | 60.1 |
| Final KOH Conc. NO Reaction change <36% |  | 50.6 | 50.6 | 50.6 |
| 3R9/1h/0V8 | min | 489 | 459 | 442 |
| 1A/Cont/1V0 | min | =46 | 41 | 33 |
| 1A/Cont/1V0 Anode Efficiency | % | 19.6% | 16.5% | 13.6% |

In Table 2, it was assumed that reaction scheme (II) did not occur. If it did not occur, then the final KOH concentration in each cell should have been 50.6%. Instead, it can be seen that the results are dramatically affected when reaction scheme 2 is assumed to occur, and the best results obtained only when both are taken into account.

TABLE 3

|  |  | 1 | 2 | 3 | 4 | 5 | 6 | 7 |
|---|---|---|---|---|---|---|---|---|
| Pellet Weight | g | 2.65 | 2.65 | 2.78 | 2.78 | 2.84 | 2.84 | 3.00 |
| Actual Pellet OD | mm | 13.45 | 13.45 | 13.45 | 13.45 | 13.45 | 13.45 | 13.45 |
| Actual Pellet ID | mm | 9.00 | 9.00 | 8.73 | 8.73 | 8.73 | 8.73 | 8.20 |
| Actual Pellet Ht. | mm | 10.20 | 10.20 | 10.20 | 10.20 | 10.80 | 10.80 | 10.80 |
| EMD Wt |  | 10.05 | 10.05 | 10.54 | 10.54 | 10.77 | 10.77 | 11.38 |
| Cathode Ah |  | 2.85 | 2.85 |  |  |  |  |  |
| Electrolyte Wt. |  | 1.40 | 1.40 | 3.60 | 1.80 | 1.77 | 1.67 | 3.30 |
| KOH Conc. | % | 36 | 36 | 37 | 37 | 36 | 36 | 36 |
| Anode Weight | g | 6.6 | 6.6 | 4 | 5.9 | 6.7 | 6.8 | 4.4 |
| Anode Type |  | Paste | Paste | Dry | Paste | Paste | Paste | Dry |
| % Zinc Powder |  | 60.30% | 67.00% | 60.00% | 67.00% | 67.00% | 73.79% | 80.00% |
| % Zinc Flake |  | 6.70% | 0.00% | 40.00% | 0.00% | 7.50% | 0.00% | 20.00% |

TABLE 3-continued

|  |  | 1 | 2 | 3 | 4 | 5 | 6 | 7 |
|---|---|---|---|---|---|---|---|---|
| % Electrolyte |  | 33.00% | 33.00% | 0.00% | 33.00% | 25.50% | 26.21% | 0.00% |
| Actual Zinc Wt |  | 4.42 | 4.42 | 4.00 | 3.95 | 4.99 | 5.02 | 4.40 |
| Separator |  | 2 Layers of VLZ105 | | | | | | |
| Anode:Cathode Ah ratio |  | 1.26 | 1.26 | 1.14 | 1.14 | 1.33 | 1.33 | 1.20 |
| Anode Porosity |  | 72.3 | 72.3 | 72.3 | 72.3 | 64.4 | 65.3 | 61 |
| Cathode Height |  | 40.8 | 40.8 | 40.8 | 40.8 | 43.2 | 43.2 | 43.2 |
| KOH Conc. | % | 36 | 36 | 37 | 37 | 36 | 36 | 36 |
| KOH Wt. | g | 1.35 | 1.35 | 1.40 | 1.45 | 1.32 | 1.31 | 1.26 |
| 100% Reaction 1 |  | >36% | >36% | >36% | >36% | >36% | >36% | >36% |
| 100% Reaction 2 |  | <29% | <29% | <29% | <29% | <29% | <29% | <29% |
| Final KOH Conc. |  | 47.7 | 47.7 | 48.7 | 48.7 | 50.6 | 50.6 | 51.9 |
| 1A/Cont/1V0 | min | 39 | 29 | 39 | 29 | 43 | 46 | 38 |

In Table 3, above, each cell contained 4 cathode pellets, each containing 94.8% EMD, 3.8% graphite and 1.6% KOH (concentration of 40%). Table 3 shows the effects of flake and varying final KOH concentration. The advantages of flake have previously been demonstrated, and are apparent from column 3. However, by far the best results are seen in columns 5 and 6, both of which have a final KOH concentration of 50.6%.

TABLE 4

|  |  | 1 | 2 | 3 | 4 | 5 | 6 | 7 | 8 |
|---|---|---|---|---|---|---|---|---|---|
| Pellet Weight | g | 2.84 | 2.84 | 2.84 | 2.84 | 2.83 | 2.83 | 2.76 | 2.76 |
| % EMD |  | 94.76% | 94.76% | 94.76% | 94.76% | 95.23% | 95.23% | 95.23% | 95.23% |
| % Graphite |  | 3.64% | 3.64% | 3.64% | 3.64% | 3.17% | 3.17% | 3.17% | 3.17% |
| Actual Pellet ID | mm | 8.73 | 8.73 | 9.00 | 9.00 | 8.73 | 9.00 | 8.73 | 9.20 |
| Cathode Ah |  | 3.07 | 3.07 | 3.07 | 3.07 | 3.07 | 3.07 | 2.97 | 2.97 |
| Cathode Porosity |  | 27.9 | 27.9 | 24.4 | 24.4 | 28.6 | 25.2 | 30.3 | 24.2 |
| Electrolyte Wt. | g | 1.85 | 1.67 | 1.68 | 1.49 | 1.70 | 1.53 | 1.80 | 1.47 |
| KOH Conc. | % | 36 | 36 | 36 | 36 | 36 | 37 | 37 | 37 |
| Anode Weight | g | 6.62 | 6.92 | 6.80 | 7.10 | 6.92 | 7.12 | 6.84 | 7.17 |
| Anode Type |  | Paste | Paste | Paste | Paste | Paste | Paste | Paste | Paste |
| % Zinc Powder |  | 75.20% | 72.00% | 73.3% | 70.20% | 72.00% | 69.90% | 71.10% | 67.80% |
| % Zinc Flake |  | 0.00% | 1.00 | 0.00% | 2.00% | 1.00% | 2.00% | 1.00% | 3.00% |
| % ZnO |  | 0.05% | 0.05% | 0.05% | 0.05% | 0.05% | 0.05% | 0.05% | 0.05% |
| Separator |  | 2*VLZ105 | 1*VLZ75/ AA:SSA | 2*VLZ105 | 1*VLZ75/ AA:SSA | 1*VLZ75/ AA:SSA | 1*VLZ75/ AA:SSA | 1*VLZ75/ AA:SSA | 1*VLZ75/ AA:SSA |
| Anode:Cathode Ah ratio |  | 1.33 | 1.33 | 1.33 | 1.33 | 1.33 | 1.33 | 1.33 | 1.33 |
| Anode Porosit | % | 63.6 | 67.3 | 65.8 | 69.2 | 67.3 | 69.3 | 68.1 | 71.4 |
| Cathode Height |  | 43.2 | 43.2 | 43.2 | 43.2 | 43.2 | 43.2 | 43.2 | 43.2 |
| KOH Conc. (starting) | % | 36 | 36 | 36 | 36 | 36 | 37 | 37 | 37 |
| Final KOH Conc. |  | 50.4 | 50.0 | 50.5 | 50.0 | 50.0 | 50.9 | 50.0 | 50.0 |
| Data |  |  |  |  |  |  |  |  |  |
| 3R9/1h/0V8 | min | 489 | 499 | 491 | 506 | 499 | 506 | 485 | 485 |

In the above Table 4, each cathode consisted of 4 pellets, each having an OD of 13.45 mm and height of 10.80 mm, and containing 1.6% KOH (40% concentration).

In Table 4, the effect of increasing anode porosity can clearly be seen. As anode porosity increases, so does ANSI/IEC performance in the 3R9/1h/0V8 test. It will be noted that the results for column 7, at first, appear anomalous. This is due to the slightly decreased theoretical anode capacity (1.33×cathode capacity), which entirely accounts for the difference.

What is claimed is:

1. An alkaline electrochemical cell containing no added mercury and comprising:

an aqueous potassium hydroxide electrolyte;
a zinc-containing anode; and
a manganese dioxide-containing cathode; wherein prior to discharge, the concentration of potassium hydroxide in the electrolyte is between about 34 and 37% w/w solution and the amount of electrolyte is such that, at a calculated level of one electron discharge of the manganese dioxide, the calculated concentration of potassium hydroxide is between 49.5 and 51.5% w/w solution.

2. The cell according to claim 1, wherein, at a depth of discharge of one electron, the calculated concentration of potassium hydroxide is about 50% w/w solution.

3. The cell according to claim 2, wherein, at a depth of discharge of one electron, the calculated concentration of potassium hydroxide is no greater than 51% w/w solution.

4. The cell according to claim 2, wherein, at a depth of discharge of one electron, the calculated concentration of potassium hydroxide is 50.6% w/w solution.

5. The cell according to claim 1, wherein, prior to discharge, the concentration of potassium hydroxide in the electrolyte is about 36% w/w solution.

6. The cell according to claim 1, having zinc oxide added to only the anode.

7. The cell according to claim 6, wherein the amount of zinc oxide added is about 0.05% w/w anode.

8. The cell according to claim 1, wherein the anode has a porosity of at least 66%, and comprises non-granular zinc.

9. The cell according to claim 8, wherein the anode has a porosity of up to about 77%.

10. The cell according to claim 8, wherein the non-granular zinc is in an amount of at least 0.6% w/w anode per 1% increase in porosity of the anode over 66%.

11. The cell according to claim 10, wherein the non-granular zinc is zinc flake.

12. The cell according to claim 8, wherein the anode comprises about 5% w/w anode of non-granular zinc.

13. The cell according to claim 12, wherein the non-granular zinc is zinc flake.

14. The cell according to claim 1, wherein the anode has a porosity of 70% to 76%.

15. The cell according to claim 14, wherein the anode has a porosity of 72% to 74%.

16. The cell according to claim 1, wherein the anode has a porosity of 66% or less and comprises no non-granular zinc.

17. The cell according to claim 1, wherein the anode contains from 60% to 77% w/w anode zinc.

18. An alkaline electrochemical cell containing no added mercury and comprising:
   an aqueous potassium hydroxide electrolyte;
   a zinc-containing anode; and
   a manganese dioxide-containing cathode; wherein
   prior to discharge, the concentration of potassium hydroxide in the electrolyte is between about 34 and 37% w/w solution;
   the amount of electrolyte is such that, at a calculated level of one electron discharge of the manganese dioxide, the calculated concentration of potassium hydroxide is between 49.5 and 51.5% w/w solution; and
   a ratio of cathode capacity:cell volume is in the range of 0.47 to 0.50 Ah/cm$^3$, when cathode capacity is calculated based on a one electron discharge of the manganese dioxide and using a molecular formula of $MnO_{1.96}$ for the manganese dioxide.

19. The cell according to claim 18, wherein a ratio of theoretical anode capacity:theoretical cathode capacity is about 1.33:1, when the theoretical cathode capacity is calculated based on a one electron discharge of the manganese dioxide and using a molecular formula of $MnO_{1.96}$ for the manganese dioxide.

20. The cell according to claim 18, wherein the cell is an LR6 cell having a theoretical cathode capacity of at least 2.9 Ah, when the theoretical cathode capacity is calculated based on a one electron discharge of the manganese dioxide and using a molecular formula of $MnO_{1.96}$ for the manganese dioxide.

21. The cell according to claim 20, wherein the theoretical cathode capacity is in the range of 2.9 to 3.1 Ah.

22. The cell according to claim 21, wherein the cell, when discharged at a constant resistance of 3.9 ohms for 1 hours per day with a rest period of 23 hours per day, reaches an endpoint voltage of 0.8 volt only after a total of at least 480 minutes discharge time.

* * * * *